Nov. 17, 1931.   S. T. NICHOLSON   1,832,784
SELF LOCKING FLOATING TIRE
Filed Jan. 29, 1931   2 Sheets-Sheet 1
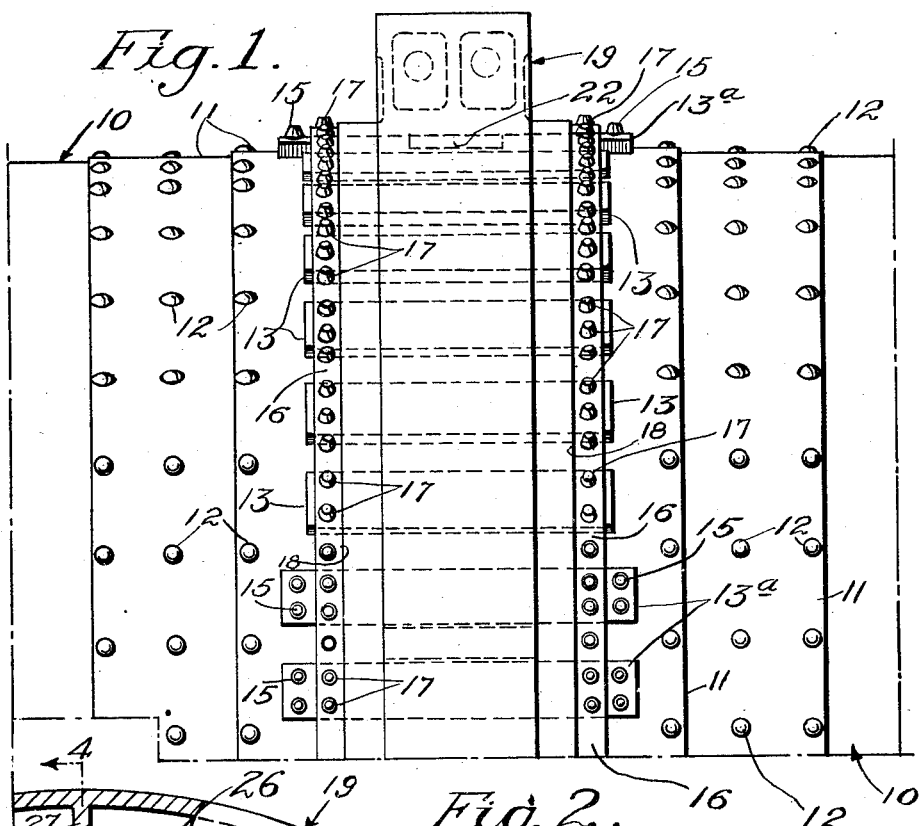
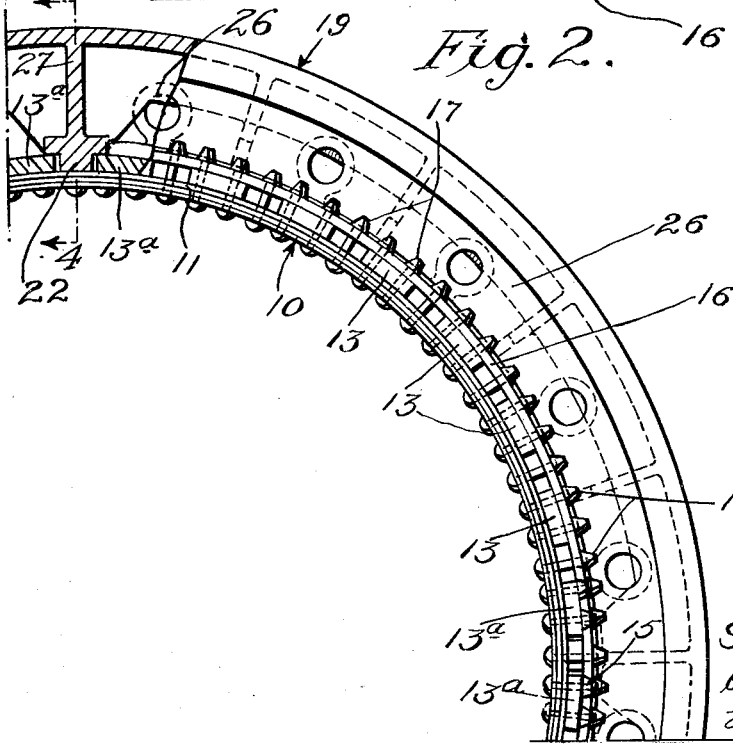
Inventor:—
Samuel T. Nicholson
by his Attorneys Nov. 17, 1931. S. T. NICHOLSON 1,832,784
SELF LOCKING FLOATING TIRE
Filed Jan. 29, 1931 2 Sheets-Sheet 2

Inventor:-
Samuel T. Nicholson
by his Attorneys
Howson & Howson

Patented Nov. 17, 1931

1,832,784

UNITED STATES PATENT OFFICE

SAMUEL T. NICHOLSON, OF WILKES-BARRE, PENNSYLVANIA, ASSIGNOR TO VULCAN IRON WORKS, OF WILKES-BARRE, PENNSYLVANIA, A CORPORATION OF PENNSYLVANIA

SELF-LOCKING FLOATING TIRE

Application filed January 29, 1931. Serial No. 512,120.

This invention relates to rotary kilns, coolers, driers, grinding mills, drums or the like, and more particularly to the construction of such devices as regards the application of the tires upon which such kilns rotate.

In the ordinary construction of such devices these tires are secured to the kiln wall by means of rivets and necessitate the use of relatively long rivets. Due to the unequal expansion of the tire and kiln wall there is a constant tendency of such rivets to loosen permitting the tire to work loose and finally to shear the rivets. Furthermore, any deflection in the shell or any looseness between the several layers of metals forming the shell will cause a similar condition resulting in a shut-down for repairs.

An important object of this invention is the provision of a tire construction and mounting permitting the tire to be applied to the kiln without the use of long rivets which are subject to shearing strains.

A still further object of the invention is the provision of a floating tire for kilns which, while free from any rivet or bolted connection with the kiln wall, is securely locked against both circumferential and longitudinal movement upon the wall.

A further object of the invention is the provision of a device of this character which may be readily and cheaply manufactured, which will be durable and efficient in service and a general improvement in the art.

These and other objects I attain by the construction shown in the accompanying drawings wherein, for the purpose of illustration, I have shown a preferred embodiment of my invention and wherein:

Fig. 1 is a fragmentary side elevation of a kiln having a tire applied thereto in accordance with my invention;

Fig. 2 is a fragmentary sectional view therethrough portions being broken away to show the locking engagement of the tire with the kiln wall;

Figure 3:
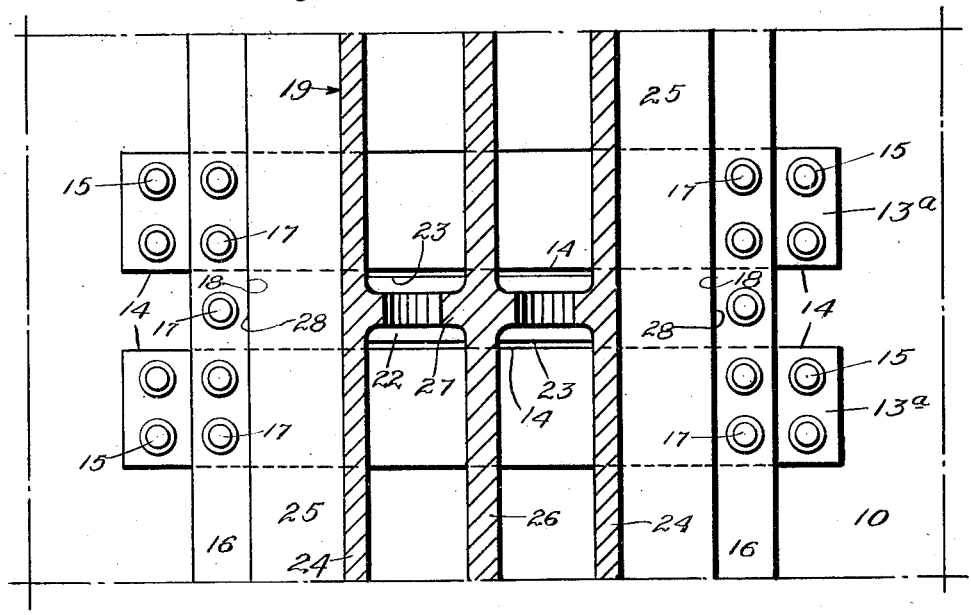
Fig. 3 is a section on line 3—3 of Fig. 4.
Figure 4:
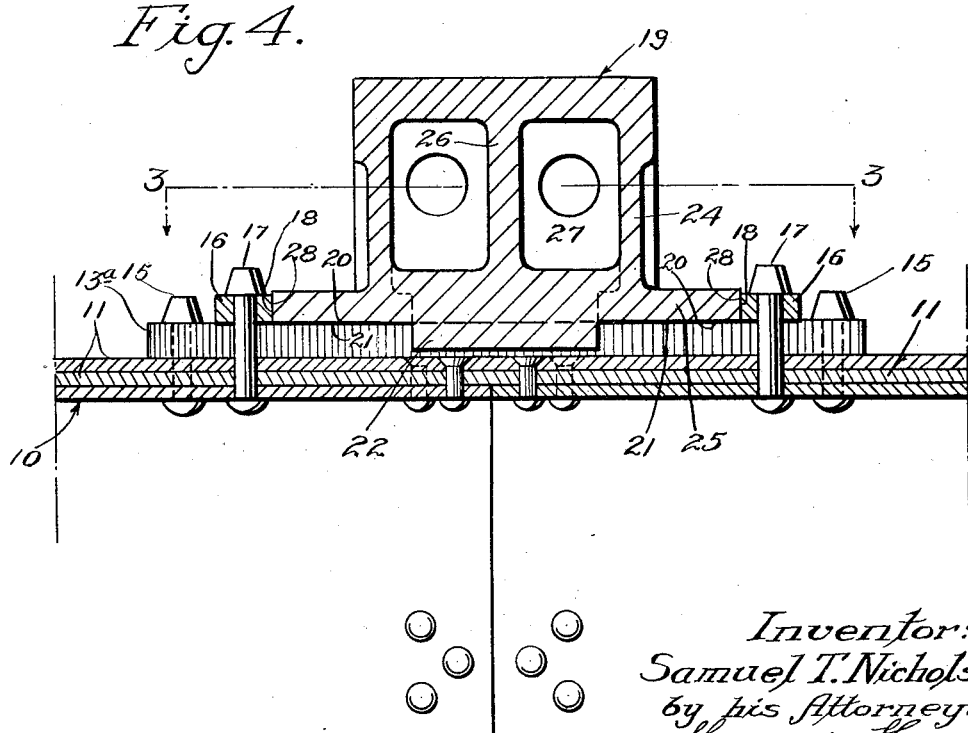
Fig. 4 is a section on line 4—4 of Fig. 2.

Referring now more particularly to the drawings, the numeral 10 generally designates the wall of a rotary kiln formed from sheet metal and reinforced by encircling sheet metal bands 11 riveted thereto at 12 at a point or points at which application of a tire is desired.

In accordance with my invention I place upon the reinforced portion, or portions, of the kiln a circumferential series of longitudinally-extending blocks 13, pairs of these blocks arranged at desired circumferentially-spaced points, and more particularly designated at 13—a, having their adjacent faces 14 exactly parallel to one another and to planes including the axis of the drum. Blocks 13—a are preferably made longer than the blocks 13 as shown in order that additional anchorage in the form of rivets 15 may be provided therefor. Anchorage for the blocks 13 and for annular bands 16 extending in parallelism about the drum is afforded through rivets 17 which likewise pass through the blocks 13—a. Adjacent faces 18 of the bands 16 are disposed in planes perpendicular to the axis of the kiln for a purpose presently to appear.

The tire 19 comprises a structure having its inner face of a diameter such that it seats upon the blocks 13, 13—a opposing faces 20 and 21 of the blocks and tire being accurately finished to provide a close fit of the tire. At points corresponding to the spacing of the pairs of blocks 13—a the inner face of the tire is formed with longitudinally-directed lugs 22, these lugs being of slightly less width than the distance between adjacent faces of blocks 13—a and having their longitudinal side faces 23 in exact parallelism to the faces 14 of these blocks. Tire 19 is preferably channel-shaped in cross section, the arms 24 thereof having projecting flanges 25 the inner faces of which form the faces 20 hereinbefore referred to. A circumferentially-extending reinforcing rib 26 projects inwardly from the cross member or base of the channel and transversely-extending reinforcing ribs 27 are preferably provided at intervals. Certain of these reinforcing ribs may have their inner ends enlarged to form the lugs 22, the ends of these lugs being connected to the flanges 25 of the arms 24. The end faces of the flanges 25 indicated at 28 are so spaced as to have a sliding fit between the faces 18 of bands 16. It will be obvious that a tire of this character, due to the projection of lugs 22 between adjacent faces of blocks 13—a and to the confinement of flanges 25 between the bands 16, is held against longitudinal movement and is capable of only a slight circumferential movement. The circumferential movement affords compensation for variations in diameter between the kiln and tire which are essential particularly at the discharge end of kilns where burning actually takes place.

A structure of this character may be readily applied to the kiln and when applied thereto eliminates the rivet shearing ordinarily present where the tires are connected through long rivets with the kiln wall and likewise prevents a stretching of the rivets and subsequent pinching-off of the heads thereof by reason of the movement that is set up by the body plates and the tires.

Since the construction employed is capable of certain change and modification without in any manner departing from the spirit of my invention, I do not wish to be understood as limiting myself thereto except as hereinafter claimed.

I claim:

1. In combination with a rotary kiln or the like, a floating tire surrounding said kiln and means free from anchoring elements extending through the kiln wall and portions of the tire maintaining said tire against longitudinal displacement and limiting circumferential displacement thereof.

2. In combination with a rotary kiln or the like, a floating tire surrounding the same and having lugs upon its inner face and means affording a seat for the tire providing sockets for the reception of said lugs.

3. In combination with a rotary kiln or the like, a floating tire surrounding the same and having lugs upon its inner face, means affording a seat for the tire providing sockets for the reception of said lugs, and means preventing longitudinal displacement of the tire upon the kiln wall.

4. In combination with a rotary kiln or the like, a floating tire surrounding the same and having lugs upon its inner face, means affording a seat for the tire providing sockets for the reception of said lugs, and annular bands preventing longitudinal displacement of the tire upon the kiln wall.

5. In combination with a rotary kiln or the like, a floating tire surrounding the same and having lugs upon its inner face, means affording a seat for the tire providing sockets for the reception of said lugs, annular bands preventing longitudinal displacement of the tire upon the kiln wall and anchoring means for said bands constituting securing means for said seat-forming means.

6. In combination with a rotary kiln or the like, an annular series of longitudinally-directed blocks secured to the wall of the kiln, pairs of said blocks at circumferentially-spaced points having their adjacent faces parallel to one another and to planes including the axis of the kiln, a tire surrounding and having its inner face closely fitting against said annular series of blocks and having lugs to engage between adjacent faces of said pairs of blocks and bands surrounding the block series at opposite sides of the tire and having their adjacent faces engaged with opposed faces of the tire.

7. In combination with a rotary kiln or the like, an annular series of longitudinally-directed blocks secured to the wall of the kiln, pairs of said blocks at circumferentially-spaced points having their adjacent faces parallel to one another and to planes including the axis of the kiln, a tire surrounding and having its inner face closely fitting against said annular series of blocks and having lugs to engage between adjacent faces of said pairs of blocks and bands surrounding the block series at opposite sides of the tire and having their adjacent faces engaged with opposed faces of the tire, said lugs being of slightly less width than the distance between adjacent faces of said pairs of blocks.

8. In combination with a rotary kiln or the like, an annular series of longitudinally-directed blocks secured to the wall of the kiln, pairs of said blocks at circumferentially-spaced points having their adjacent faces parallel to one another and to planes including the axis of the kiln, a tire surrounding and having its inner face closely fitting against said annular series of blocks and having lugs to engage between adjacent faces of said pairs of blocks, bands surrounding the block series at opposite sides of the tire and having their adjacent faces engaged with opposed faces of the tire, and securing elements for said bands extending through said blocks and through the kiln wall.

SAMUEL T. NICHOLSON.